United States Patent Office 2,866,296
Patented Dec. 30, 1958

2,866,296

PROCESS OF CONDITIONING SOIL FOR GROWING PLANTS BY UTILIZING POLYSACCHARIDE ESTERS OF POLYBASIC ACIDS

Geoffrey W. Meadows, Kennett Square, Pa., assignor to E. I. du Pont de Nemours and Company, Wilmington, Del., a corporation of Delaware No Drawing. Application November 17, 1954
Serial No. 469,553

12 Claims. (Cl. 47—58)

This invention relates to methods for improving the physical structure of soil; in other words, for doing what is now commonly called soil conditioning.

More particularly, the invention relates to soil conditioning methods comprising applying to the soil a water soluble polysaccharide ester of a polybasic acid. More particularly, the polysaccharide esters employed are those of polybasic acids containing at least two oxygen atoms in each acid function and in which at least one acid group is bonded to the polysaccharide thru an ester linkage and at least one acid group is unesterified and can be either in the free acidic form or in the form of its salt.

The word "soil," as it is used in the present disclosure, has the meaning attributed to the noun derived from the Latin solum in Webster's New Collegiate Dictionary, second edition, copyright 1953 by G. & C. Merriam, at p. 804, viz. "firm land; earth. The upper layer of earth which may be dug, plowed, etc.; specif., the loose surface material of the earth in which plants grow."

The polysaccharide esters most preferably employed in the methods of the invention are those containing from 0.1 to 3.0 and still more preferably from 0.3 to 1.5 ester groups per monosaccharide unit. Thus, the polysaccharide esters employed in the processes of the invention are conveniently represented by the formula

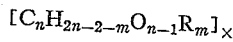

$$[C_nH_{2n-2-m}O_{n-1}R_m]_x$$

where $n$ is 5 or 6, $m$ is from 0.1 to 3.0 and more preferably from 0.3 to 1.5, $x$ is the degree of polymerization, and R is a polybasic oxygen containing acid residue, with at least one acid group being bonded to the polysaccharide thru an ester linkage and at least one acid group in the free acidic form or in the form of its salt.

The polysaccharide esters are conveniently prepared by reacting the polysaccharide with a polybasic acid, acid chloride, or acid anhydride, usually in a suitable solvent. The polysaccharide esters of polybasic acids thus obtained are frequently water soluble and if they are not readily soluble in water, they can be solubilized by converting any free acidic groups to salts such as the sodium, potassium, calcium, magnesium, ammonium, quaternary ammonium or pyridinium salts, for example, by treatment with the appropriate base or basic salt.

The polysaccharides employed in preparing the polysaccharide esters used in the processes of this invention are pentosans or hexosans. Illustrative of the polysaccharides so used are cellulose, starches, dextrins, hemicelluloses, pectins, dextrans, levans, laminarons, agars and xylans. The esters can be prepared from these polysaccharides of commerce or more economically they can be prepared by the direct esterification of crudes such as wood pulp, cotton linters, sawdust, corn cobs, seed hulls, straw, seaweed, fruit pulp, sugar beet pulp, bagasse, waste paper, rags, potatoes, wheat, rice and corn.

While esters of low molecular weight polysaccharides, both linear and branched, for example those obtained by esterification of hemi-cellulose from wood and agar from seaweed, can be used, the esters of high molecular weight branched polysaccharides such as those obtained by esterification of starches from corn or potato have greater soil conditioning activity. Still more preferred because of their greater soil conditioning activity are the esters of high molecular weight linear polysaccharides, for example, such as those obtained by esterification of cellulose from cotton linters or wood pulp.

Illustrative of the polybasic acids which can be reacted with any of the foregoing polysaccharides to obtain the polysaccharide esters employed in the compositions of the invention are the following: inorganic polybasic acids such as sulfuric, phosphoric; aliphatic dicarboxylic acids such as oxalic, malonic, succinic, maleic, fumaric; alicyclic dicarboxylic acids such as the cyclobutane dicarboxylic acids; aromatic dicarboxylic acids such as phthalic, isophthalic, terephthalic and the naphthalene dicarboxylic acids; aromatic disulfonic acids such as those of benzene and naphthalene.

Water solubility is a characteristic of the polysaccharide esters employed in the methods of this invention. By "water soluble" as used herein, I mean that at least 0.1 g. of the polysaccharide compound dissolve in 100 ml. of water at 25° C.

The polysaccharide ester compositions can be applied to the soil following conventional soil conditioning techniques. Thus, the esters can be applied in dry form to the surface of the soil for admixture therewith, or alternatively, they can be applied from liquid dispersions, or in the case of water soluble polysaccharide esters from aqueous solutions.

The rate or dosage of application of the polysaccharide ester to the soil to obtain the desired improvement in soil texture or erosion control will vary with the particular polysaccharide ester used and with the soil type. In general, satisfactory results will be obtained by applying the composition in amount sufficient to obtain a polysaccharide ester concentration in the soil of from about 0.001% to 0.5% by weight and more usually from about 0.01% to 0.1% by weight; in other words, application of the composition is continued until the soil to be conditioned contains an amount of the polysaccharide ester within that range, based on the dry weight of the soil.

The invention is further illustrated by the following examples which show the preparation of various polysaccharide esters, their application for conditioning soil, and the soil conditioning results obtained thereby.

*Example 1*

11.5 parts by weight of freshly distilled chlorosulfonic acid, 55 parts by weight of pyridine and 2.5 parts by weight of cotton linters, having a degree of polymerization of about 1800, were heated at about 95–100° C. for one and one-half hours. There was thus obtained a slurry of cellulose sulfate in pyridine. The cellulose sulfate contained approximately 0.5 ester groups per glucose unit and approximately one free acid group for each esterified group.

The product of the above reaction was added to 200 parts of water and the resulting viscous solution was applied to soil and evaluated as described below:

The soil used in the evaluations in this and the subsequent examples was a silt loam sub-soil obtained from Newark, Delaware. The physical analysis of the soil showed it to contain 26% sand, 50% silt, and 18% clay. By chemical analysis, the soil was found to have an organic content of 4.5% and a nitrogen content of 0.11%. Reference in this and subsequent examples to parts by weight of soil means parts by weight on a dry basis.

Portions of the solution prepared as described above were added to separate portions of soil in amounts sufficient to provide 0.18 and 0.24 part by weight respectively of the cellulose sulfate per 100 parts by weight of soil.

Sufficient water was added to enable the soil to be worked into a plastic condition and the soil thus treated was allowed to age for about one hour. The treated soil was then evaluated, to determine the soil conditioning action of the composition applied, by using the standard so-called "wet sieve" procedure disclosed in Bryant, J. C., Bendixon, T. W., and Slater, C. S., (Measurement of the Water Stability of Soils), Soil Science, 65, 341–5, (1948).

Basically, the evaluation test involves first passing the aged treated soil paste thru a five millimeter round hole screen to provide crumb-like particles which are dried at 40° C. in an air circulating oven for 24 hours and then screened using a 3 mm. round hole screen to remove fine dust; a 25 g. sample of the dried soil crumbs retained on the 3 mm. screen is then charged to a 10-mesh U. S. Bureau of Standards series sieve which is then placed on top of a 35-mesh sieve. The two sieves are fastened together and immersed in a bath of water and the soil crumbs are soaked in the water for a period of one minute. The sieves are then mechanically raised and lowered in the bath thru a stroke length of ¾", 35 times a minute for two minutes. The soil remaining on the sieves is then dried and weighed and the dry weight of the crumbs remaining on the screens is expressed as the percentage of the original soil crumbs charged. The test is designed to show the percentage of stable soil aggregates of size greater than 0.5 mm. and thus provides a comparative measure of the soil aggregating or conditioning action of the material being tested.

Untreated soil when tested by the above described method contained about 6% soil aggregates greater than 0.5 mm. In comparison with this untreated material, it was found that the soil treated with 0.18 part by weight of cellulose sulfate per 100 parts by weight of soil contained about 37% stable soil aggregates greater than 0.5 mm., and the soil treated with 0.24 part by weight of cellulose sulfate per 100 parts by weight of soil contained about 67% stable soil aggregates greater than 0.5 mm.

*Example 2*

To a solution of 50 parts by weight of phthalic anhydride in 200 parts by weight of pyridine were added 10 parts by weight of cotton linters having a degree of polymerization of about 1800. The resulting slurry was heated to 50–60° C. with stirring, for 48 hours. The resulting highly viscous mass was mixed with 1200 parts by weight of methanol with vigorous agitation. A sticky precipitate formed which was re-slurried twice with methanol and filtered. The filter cake, cellulose phthalate, was broken up and oven dried at 60° C. and then ground to pass thru an 80-mesh U. S. Bureau of Standards series sieve.

The cellulose phthalate prepared according to this example contained approximately 0.6 phthalate groups per glucose unit and the phthalic acid was partially esterified, containing approximately one free carboxylic group for each such group which was esterified. The cellulose phthalate, prepared as described above, was converted to its sodium salt by solution of 2 parts by weight of the phthalate to 60 parts by weight of ⅙ N sodium hydroxide solution. The resulting viscous solution was adjusted to pH 6.8 by the addition of normal sodium di-hydrogen phosphate solution and then diluted to 200 parts by weight by addition of water. The resulting aqueous solution was applied to the test soil in amount sufficient to provide 0.06 and 0.10 part by weight of the cellulose phthalate sodium salt per 100 parts by weight of the soil, dry basis, and the treated soil was evaluated by the wet sieve test in the manner described in Example 1.

The soil treated at the 0.06% level contained about 49% stable soil aggregates greater than 0.5 mm., and the soil treated at the 0.10% level contained about 79% stable soil aggregates greater than 0.5 mm.

*Example 3*

In this example, solid powdered sodium cellulose sulfate was used. The powdered sodium cellulose sulfate was mixed with the test soil in amount sufficient to provide 0.16 and 0.32 part by weight of the sodium cellulose sulfate per 100 parts by weight of soil, dry basis, and sufficient water was added to enable the soil to be worked into a paste-like mass. After allowing to age for about one hour, the soil paste was pressed into crumb-like particles which were dried and tested by the wet sieve procedure described in Example 1.

The soil treated with 0.16% sodium cellulose sulfate contained about 47% soil aggregates greater than 0.5 mm., and that treated with 0.32% of sodium cellulose sulfate contained about 90% stable soil aggregates greater than 0.5 mm.

I claim:

1. A method for conditioning soil in which plants are to be grown, said method comprising applying to the soil a water soluble polysaccharide ester of a polybasic acid containing at least two oxygen atoms in each acid function in which at least one acid group is bonded to the polysaccharide through an ester linkage and at least one acid group is unesterified.

2. A method for conditioning soil in which plants are to be grown, said method comprising applying to the soil a water soluble polysaccharide ester of a polybasic acid containing at least two oxygen atoms in each acid function in which at least one acid group is bonded to the polysaccharide through an ester linkage and at least one acid group is unesterified, said ester having from 0.1 to 3.0 ester groups per saccharide unit and said polysaccharide being selected from the group consisting of pentosans and hexosans.

3. A method for conditioning soil in which plants are to be grown, said method comprising incorporating in the soil about 0.001% to 0.5% by weight, based on the dried weight of the soil, of a water soluble polysaccharide ester of a polybasic acid containing at least two oxygen atoms in each acid function in which at least one acid group is bonded to the polysaccharide through an ester linkage and at least one acid group is unesterified, said polysaccharide being selected from the group consisting of pentosans and hexosans.

4. A method for conditioning soil in which plants are to be grown, said method comprising applying to the soil about 0.01 to 0.1% by weight based on the dry weight of the soil to be conditioned of a water soluble polysaccharide ester of a polybasic acid containing at least two oxygen atoms in each acid function in which at least one acid group is bonded to the polysaccharide through an ester linkage and at least one acid group is unesterified, said ester having from 0.3 to 1.5 ester groups per monosaccharide unit and said polysaccharide being selected from the group consisting of pentosans and hexosans.

5. A method of claim 4 in which any unesterified acid group in the ester is in the free acidic form.

6. A method of claim 4 in which any unesterified acid group is in the form of a salt.

7. Soil in which plants are to be grown, said soil being conditioned by being mixed with a water-soluble polysaccharide ester of a polybasic acid containing at least two oxygen atoms in each acid function in which at least one acid group is bonded to the polysaccharide through an ester linkage and at least one acid group is unesterified.

8. Soil in which plants are to be grown, said soil being conditioned by being mixed with a water soluble polysaccharide ester of a polybasic acid containing at least two oxygen atoms in each acid function in which at least one acid group is bonded to the polysaccharide through an ester linkage and at least one acid group is unesterified, said ester having from 0.1 to 3.0 ester groups per saccharide unit and said polysaccharide being selected from the group consisting of pentosans and hexosans.

9. Soil in which plants are to be grown, said soil being conditioned by being mixed with about 0.001% to 0.5% by weight, based on the dried weight of the soil, of a water soluble polysaccharide ester of a polybasic acid containing at least two oxygen atoms in each acid function in which at least one acid group is bonded to the polysaccharide through an ester linkage and at least one acid group is unesterified, said polysaccharide being selected from the group consisting of pentosans and hexosans.

10. Soil in which plants are to be grown, said soil being conditioned by being mixed with about 0.01 to 0.1% by weight based on the dry weight of the soil to be conditioned of a water soluble polysaccharide ester of a polybasic acid containing at least two oxygen atoms in each acid function in which at least one acid group is bonded to the polysaccharide through an ester linkage and at least one acid group is unesterified, said ester having from 0.3 to 1.5 ester groups per monosaccharide unit and said polysaccharide being selected from the group consisting of pentosans and hexosans.

11. A composition of claim 10 in which any unesterified acid group is in the free acidic form.

12. A composition of claim 10 in which any unesterified acid group is in the form of a salt.

References Cited in the file of this patent

UNITED STATES PATENTS

| | | |
|---|---|---|
| 2,093,464 | Malm et al. | Sept. 21, 1937 |
| 2,297,063 | McKesson | Sept. 29, 1942 |
| 2,535,644 | Martin | Dec. 26, 1950 |
| 2,625,529 | Hedrick et al. | Jan. 13, 1953 |
| 2,676,108 | Fuller et al. | Apr. 20, 1954 |
| 2,753,337 | Klug | July 3, 1956 |

FOREIGN PATENTS

| | | |
|---|---|---|
| 903,998 | France | Oct. 23, 1945 |
| 408,983 | Italy | Apr. 28, 1943 |

OTHER REFERENCES

Transactions, Fourth International Congress of Soil Science, vol. I, pages 198–201 (July 24–August 1, 1950).

Touey: "Sodium Cellulose Sulfate," Modern Plastics, vol. 29, No. 3, November, 1951, pages 109, 110, 112, 114, 183, 184.

Annett et al.: "Utilization of Sulfite Pulp Mill Wastes," published December, 1952, in Paper Industry, vol. 34, No. 9, pages 1109 through 1111.